Dec. 13, 1955  W. J. BONGERS  2,726,686
JIG FOR WINDING GRID WIRES
Filed June 13, 1951
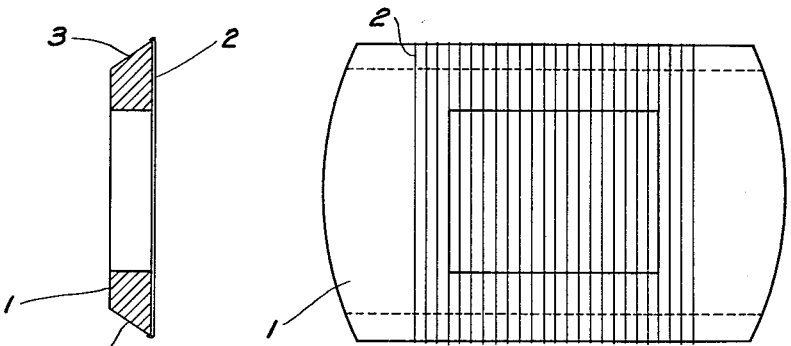
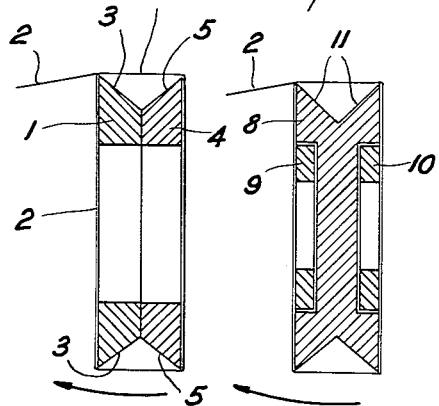
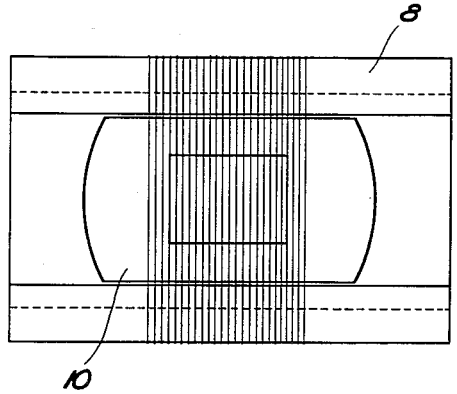
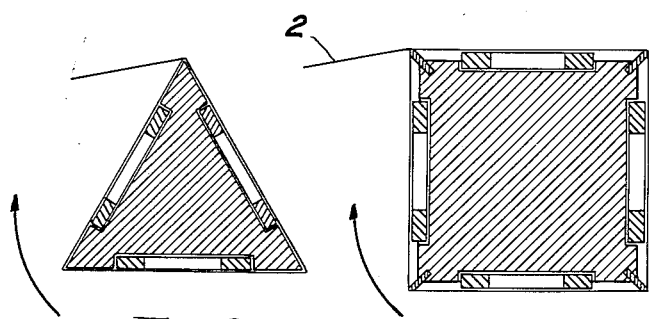
INVENTOR.
WILHELMUS JOHANNES BONGERS
BY
AGENT.

United States Patent Office 2,726,686
Patented Dec. 13, 1955

2,726,686

JIG FOR WINDING GRID WIRES

Wilhelmus Johannes Bongers, Eindhoven, Netherlands, assignor to Hartford National Bank and Trust Company, Hartford, Conn., as trustee Application June 13, 1951, Serial No. 231,404

Claims priority, application Netherlands June 15, 1950

2 Claims. (Cl. 140—71.5)

This invention relates to an improved jig for winding grids on flat frames for use in electric discharge tubes.

Grids are commonly formed in pairs by arranging two frames, each having an aperture, against one another or against a winding jig, and by winding the grid wire across the frames and apertures of the winding structure. After the wire has been secured to the frames, preferably with the use of solder, for example gold, and after the wire portions protruding beyond the frames have been removed, the frame-shaped grids can be removed from the winding structure.

It is very different to wind wire of less than 25 microns in diameter at a uniform pitch of less than 50 microns on a winding structure having flat surfaces because the wire does not have a uniform cross sectional area. The irregularities of such a fine wire cause it to tilt when wound on flat edge surfaces of a winding structure causing, in turn, irregularities in the pitch of the grid wires. The grid wires as commonly wound barely touch the flat grid sides of the frame, but do rest upon the remaining flat surfaces of the frame.

The main object of the invention is to provide an improved structure for winding grid wires at a uniform pitch.

Further objects of the invention will appear as the specification progresses.

According to the invention an improved structure for winding grid wires is composed of one or more frames each having an aperture and a sharp edged jig to contain said frames so that the grid wires only rest on said sharp edges.

Since the diameter of the wire is very small and the tensile force exerted on the wire is very high during the winding operation the sharp side of the edges must be rounded so that the wire is not cut during said operation or during the heating of the frame. Accordingly, the term "sharp edge" is to be understood to mean here an edge with which the apex of the cross-sectional area is smaller than 90°. The term "grid plane of the winding structure" is to be understood to mean each plane of this structure in which a surface of the grid frame provided with wires is located. Since, with a winding jig having grooved edges according to the invention, the wire only bears on sharp edges, the possibility that exactly an uneven part should engage the sharp edge is much smaller, so that tilting is substantially avoided.

In many cases the winding jig comprises two grid frames, their rear sides engaging one another; their edges must therefore be bevelled towards the rear and form a V-shaped groove across which the grid wire is wound. However, as an alternative, the winding jig may be constituted by a primarily rectangular winding jig having grooved edges across which the wire is wound, while a grid frame is clamped to one side surface of the jig or one frame to each of the side surfaces. Before and after the grid wire has passed by each frame, it is then bent over a sharp edge. In this case use may be made of grid frames of conventional form, i. e. without bevelled edges. The winding jig may have recesses to accommodate the grid frames.

In order that the invention may be more clearly understood and readily carried into effect, it will now be described more fully with reference to the accompanying drawing, in which Fig. 1 is a front view and
Fig. 2 a side view of a grid
Fig. 3 illustrates how grids are wound and
Fig. 4 is a cross sectional view of a thin grid wire;
Fig. 5 is a side view of part of such a wire and
Figs. 6, 7, 8 and 9 show further embodiments of a winding jig.

Referring to Fig. 1, the frame 1, which is preferably made of molybdenum, supports on one side a plurality of grid wires 2 of, for example, $5\mu$ of thickness. The frame, for example, is constituted by a disc having a diameter of 9 mm., two segments of which have been cut off, so that straight edges for winding the grid wire are formed. The thickness of the frame is, for example, 0.5 mm. and provision is made, for example, of a rectangular aperture of 4 by 4 mm. When a winding jig built up from two of such frames is formed by arranging the frames against one another in the usual manner, the grid wire bears through a stretch of twice the thickness of the frames i. e. for 1 mm. in this case, on the flat side edge. Consequently the wire not only bears on the sharp edges, but also on the entire side surface, since the edge is a 90° angle. If part of the wire having a cross-sectional area as shown by way of example in Fig. 4 finds its way to this side edge, the wire tilts over, so that a divergence in pitch is produced. Such divergences 7 only occur in short stretches of the wire, as is shown in Fig. 5, but it has been found that the possibility of tilting is nevertheless so great that practically no regular grid can be wound, since such a grid frequently has about 80 turns, which corresponds in this case with a wound length of wire of 160 mm. for two grids, whilst the said irregularities frequently succeed one another in intervals of a few decimeters or less. If, as is shown in Figs. 2 and 3, two frames 1 and 4 having bevelled sides 3 and 5 are arranged against one another so that the bevelled sides form a V-shaped groove, the wire bears with its parts 6 only on two sharp edges. The possibility that an irregularity as shown in Fig. 4 should exactly contact with such an edge is much smaller than if the wire is supported in each turn on twice the length of 1 mm. In any event, it is now possible to wind grids with an extremely regular pitch. Subsequent to the winding operation the grid wires are soldered, for example, with the use of gold, to the frames and the wire portions beyond the frames 6 are removed, so that two flat grids are obtained, after the frames have been removed from the winding former.

In the embodiment shown in Figs. 6 and 7 two frames 9 and 10 are clamped against the flat sides of the winding jig 8, after which the wire 2 is wound on the winding former. The jig 8 has grooved edges 11 in accordance with the invention, so that the wire is supported between the grid planes only by two sharp edges. If desired, the frames 10 may be slipped under the grid wires, after having wound the wires on the jig. For this purpose the winding jig has to be provided with recesses, so that the frames can be slipped under the wires without coming into contact herewith. In this case the frames may be shaped in the conventional form. As is shown in Figs. 8 and 9, the winding jig may, as an alternative, have a cross-sectional area of the shape of a polygon.

It is obvious that the frames may have other shapes and, if desired, be in part secured to one another in the shape of a strip, whilst a winding jig may be provided with a plurality of frames. For this purpose the winding structure may have a triangular, quadrangular or polygonal cross-sectional area.

While the invention has been described with reference to specific examples and applications thereof other modifications will be readily apparent to those skilled in the art without departing from the spirit and scope of the invention as defined in the appended claims.

What I claim is:

1. An apparatus for winding a flat grid with wires of less than 25 microns in diameter and with a pitch of less than 50 microns for an electric discharge tube, comprising a support member having flat surface portions forming sharp straight edges at the junctions of adjoining surface portions and having an angle of less than 90° between the adjoining surface portions, a plurality of said surface portions having apertures therein, said apertures having a depth approximately the same as the thickness of said flat grid.

2. An apparatus for winding a flat grid with wires of less than 25 microns and with a pitch of less than 50 microns for an electric discharge tube, comprising a support member having oppositely-disposed flat surface portions and inwardly-bevelled side surface portions adjoining corresponding sides of said flat surface portions, said side and flat surface portions forming sharp straight edges at the junctions thereof having an angle of less than 90° between the adjoining surface portions, said flat surface portions having apertures therein, said apertures having a depth approximately the same as the thickness of said flat grid.

References Cited in the file of this patent

UNITED STATES PATENTS

| | | |
|---|---|---|
| 1,365,015 | Zwicker | Jan. 11, 1921 |
| 1,478,071 | Trimble | Dec. 18, 1923 |
| 1,974,312 | Murphy | Sept. 18, 1934 |
| 2,000,163 | Clark | May 7, 1935 |
| 2,068,675 | Heller | Jan. 26, 1937 |
| 2,283,880 | Heller | May 19, 1942 |
| 2,379,135 | Ekstedt | June 26, 1945 |
| 2,610,387 | Borland | Sept. 16, 1952 |